INVENTORS
Jugal K. Gogia
William L. Hinde
Kurt Seldner

ATTORNEYS

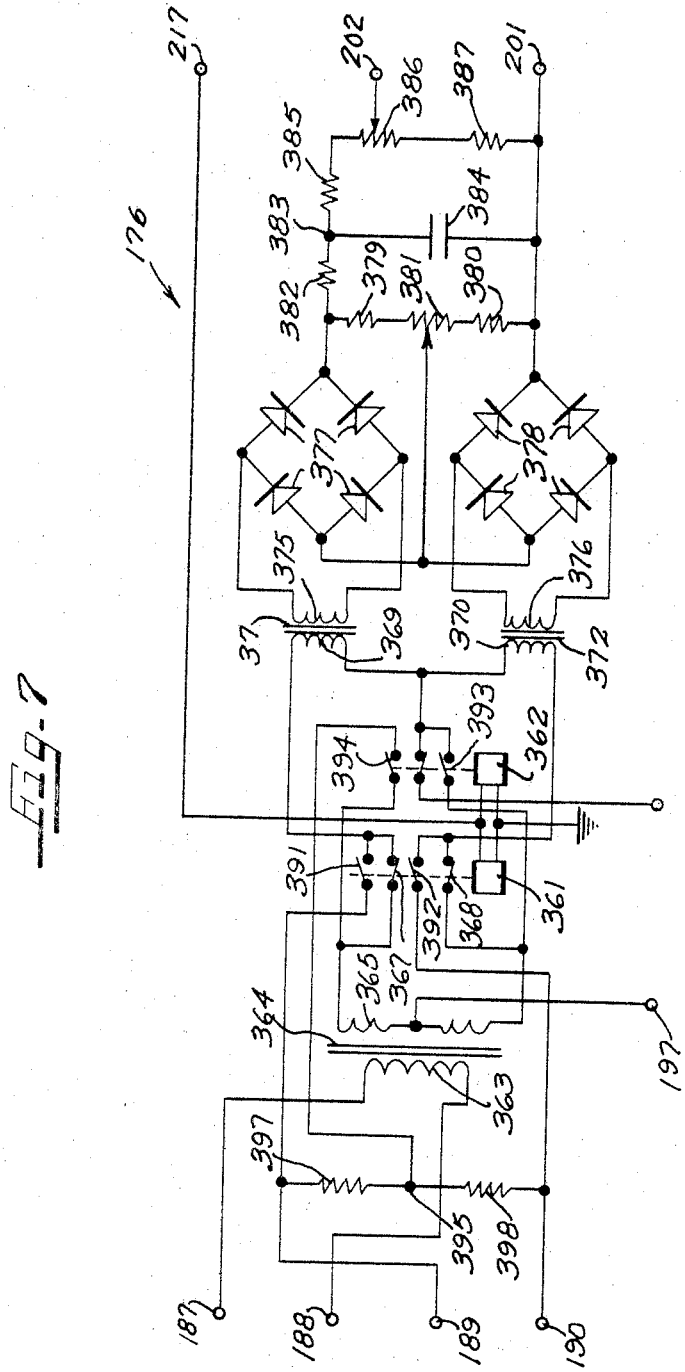

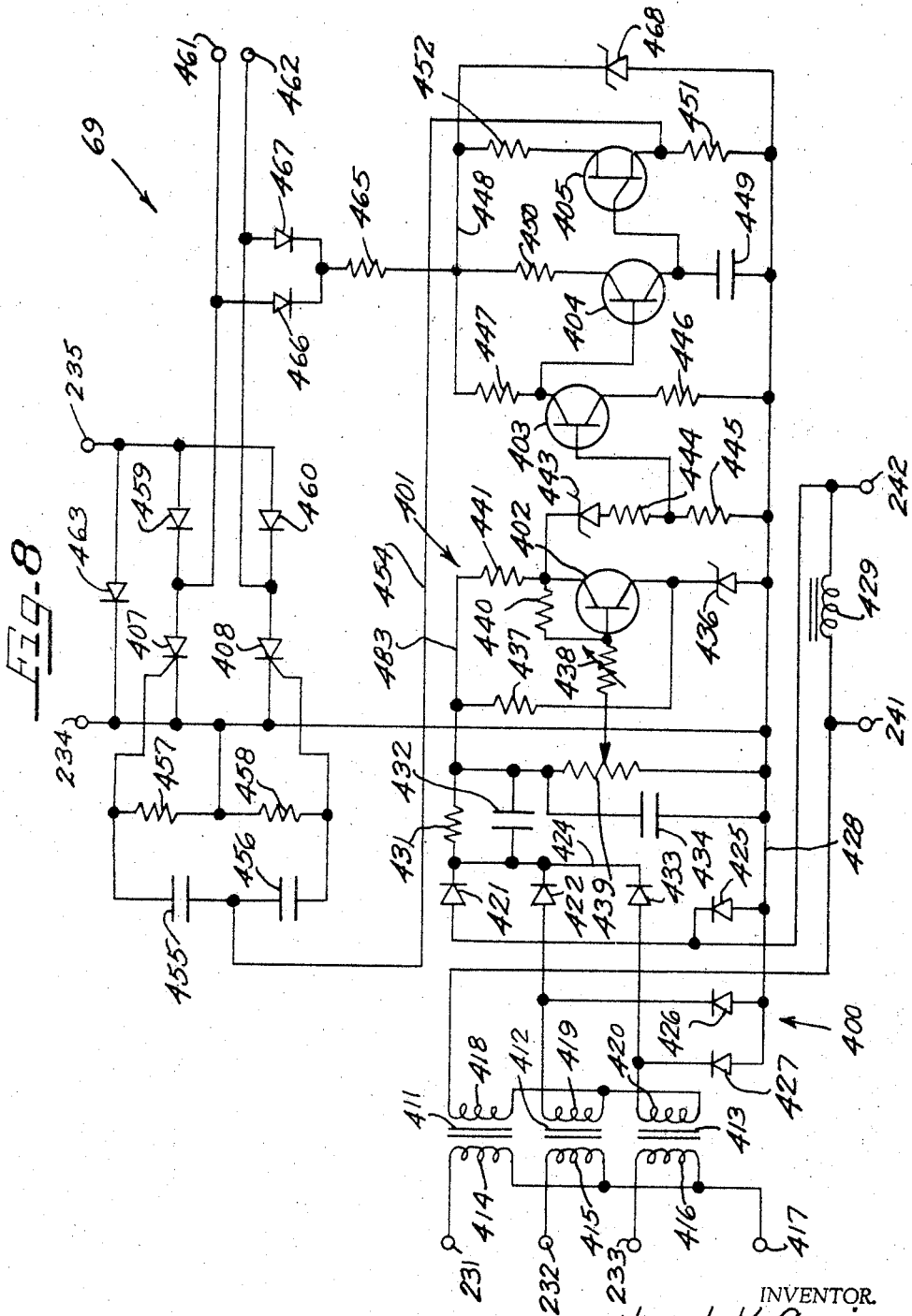

United States Patent Office 3,427,466
Patented Feb. 11, 1969

3,427,466
MODULAR GAS TURBINE ENERGY SYSTEM
Jugal K. Gogia, Cleveland Heights, William L. Hinde, Euclid, and Kurt Seldner, University Heights, Ohio, assignors to TRW Inc., Cleveland, Ohio, a corporation of Ohio
Filed Oct. 28, 1963, Ser. No. 319,203
U.S. Cl. 307—57          7 Claims
Int. Cl. H02j 3/08, 3/40

ABSTRACT OF THE DISCLOSURE

A system for supplying power to first and second loads at a first lower frequency and at a second higher frequency. Means are provided to establish synchronism between the output voltage of an alternator and the load voltage thereof and means are provided for connecting the synchronized alternator to the load. A load balancing circuit is provided to obtain a balance between the load supplied by the so connected alternator and the load supplied by the previously connected alternators. The second higher frequency alternator is connected to the load after the connection of the lower frequency alternator and after synchronism is achieved between the output voltage of the alternator and the load. Subsequently, the second higher frequency alternator is balanced with other alternators of the same frequency to assure that each alternator substantially equally shares the power being supplied to the load.

This invention relates to a modular gas turbine energy system and more particularly to a system which was specifically designed for economically and reliably producing electrical energy from natural gas, although it will be apparent that various features of the invention have other applications.

In the system of this invention, a plurality of modules or units are provided each including a gas turbine and at least one alternator driven thereby, with means for paralleling the alternators to supply energy to a load. One important feature of the invention is in the supply of electrical power at two or more frequencies and in the direct drive of a plurality of alternators operative at such frequencies from each turbine, with means for paralleling the outputs at the frequencies as required. In a system as specifically designed, a dual frequency operation is used wherein each module or unit includes a 60 cycle alternator and a 420 cycle alternator driven from a common shaft which is driven from the turbine of the unit. It will be understood that the same concepts as applied to a dual frequency system can be applied to a system for supplying power at three or more frequencies, and the recitation of dual or two frequency systems herein shall be construed to include systems for supplying power at additional frequencies.

The plural frequency feature is important in that the higher frequency power (420 cycles) is advantageous for certain loads such as in fluorescent lighting to obtain higher efficiency and/or to reduce the size of magnetic and other parts, while the lower frequency power (60 cycles) is necessary for the operation of standard devices specifically designed for that frequency. With the direct drive of the plurality of different frequency alternators from each turbine, the total load requirements can be satisfied with a minimum number of units operating and in which each unit operates at peak efficiency.

Additional very important features of the invention reside in methods and means for properly synchronizing and parallelling the dual frequency alternators, the division of real and reactive loads for both frequencies, the maintenance of stable operation and the control of frequency and voltage levels.

With respect to the requirements for real and reactive load division, such are best understood by a vector analysis of the relationships between voltage, current and flux in a synchronous generator. In general, the effective magnetomotive force in a generator is the vector resultant of a magnetomotive force due to the generator field and a magnetomotive force due to output current. The voltage generated may be considered to be a vector at 90° to the resultant or effective magnetomotive force, and the output voltage is the vector combination of the generated voltage and the ohmic and reactive drops due to output current. The frequency of an alternator is established by the angular velocity of the flux field under steady-state conditions, which velocity is set by the speed of the shaft and the number of poles contained in the alternator. Since shaft speed is determined by the prime mover speed control, the frequency is also dependent on that control. The voltage level is also affected by the velocity of the flux field, but can be independently varied by adjusting the magnetomotive force of the field to set the total magnetomotive force.

When two alternators are operated in parallel, the output voltage and frequency must be identical and under the condition of perfect real and reactive load division, the alternators have identical generated voltages, ohmic and reactance drops, currents and phase relationships within and between the alternators, assuming that they are of equal size. If they are not of equal size, the same results can be obtained by using percentages or per unit values for current and impedance.

If two paralleled alternators are initially operated under perfect real and reactive load division conditions, and the field magnetomotive force applied to one alternator is increased slightly while the field magnetomotive force applied to the other is decreased a like amount, the load balance is upset. From a vector analysis, it is found that the resulting unbalance is almost completely a reactive load unbalance. This fact arises from a condition prevalent in alternators that the armature reactance is much much greater than armature resistance. From this analysis, it can be concluded that the reactive load unbalance is primarily maintained by control of field excitation and in the system of this invention, signals are applied to voltage regulators in a manner to obtain proper reactive load division.

With regard to real load division, if a perfectly balanced load condition is upset by a small increase in the torque supplied to one alternator and an equivalent decrease in the torque applied to another, the frequency of one will increase while the frequency of the other decreases until the real load has been adjusted to balance the torque change. When the new condition is established, the frequencies will be equal, but the perfect phase relation between the machines will have been disturbed. A vector analysis of the effect of such a change in torque shows that the result is principally in an unbalance in the real load division of the machines. This shows that the real load division must be controlled by adjustment of the power delivered by the turbines and in accordance with this invention, a speed control system for the turbines is controlled in response to a signal corresponding to real load unbalance of paralleled alternators.

It should be noted that although the principal factors affecting real and reactive load division can be isolated, the small interactions cannot be completely ignored. However, these intercations are not of great significance for proper realization of steady-state operation and if real load division is held to within normally accessible limits, for example, any contribution to reactive load unbalance will be small.

With regard to a dual frequency system, the same type of vector analysis can be applied. As to reactive load division, the requirements are essentially the same as for a single alternator system, with each of the sections having its own voltage regulation system in accordance with this invention.

With regard to real load division among duel frequency paralleled alternators, analysis shows that it is very important that the mechanical phase relation of the rotors of the two alternators on the shaft be accurately determined. In addition, it is found that the highest degree of accuracy is obtained by setting the real load division in accordance with the requirements of the higher frequency section.

With regard to parallelling of the dual frequency alternators, it is found to be very important that the lower frequency or 60 cycle alternator be first placed on the line and to then accomplish a load balance among the 60 cycle alternators on the line, before attempting to place the higher frequency or 420 cycle alternator on the line. If this sequence is not followed, the synchronization may not take place on the proper cycle of the higher frequency voltage, and a proper load balance among alternators on the line will not be obtained.

This invention contemplates other and more specific objects, features and advantages which will become more fully apparent from the following detailed description taken in conjunction with the accompanying drawings which illustrate a preferred embodiment and in which:

FIGURE 7 is a circuit diagram of a 60 cycle phase discriminator and load sensor of the circuit of FIGURE 3; and FIGURE 8 is a circuit diagram of a 60 cycle voltage regulator of the circuit of FIGURE 2.

Figure 1:
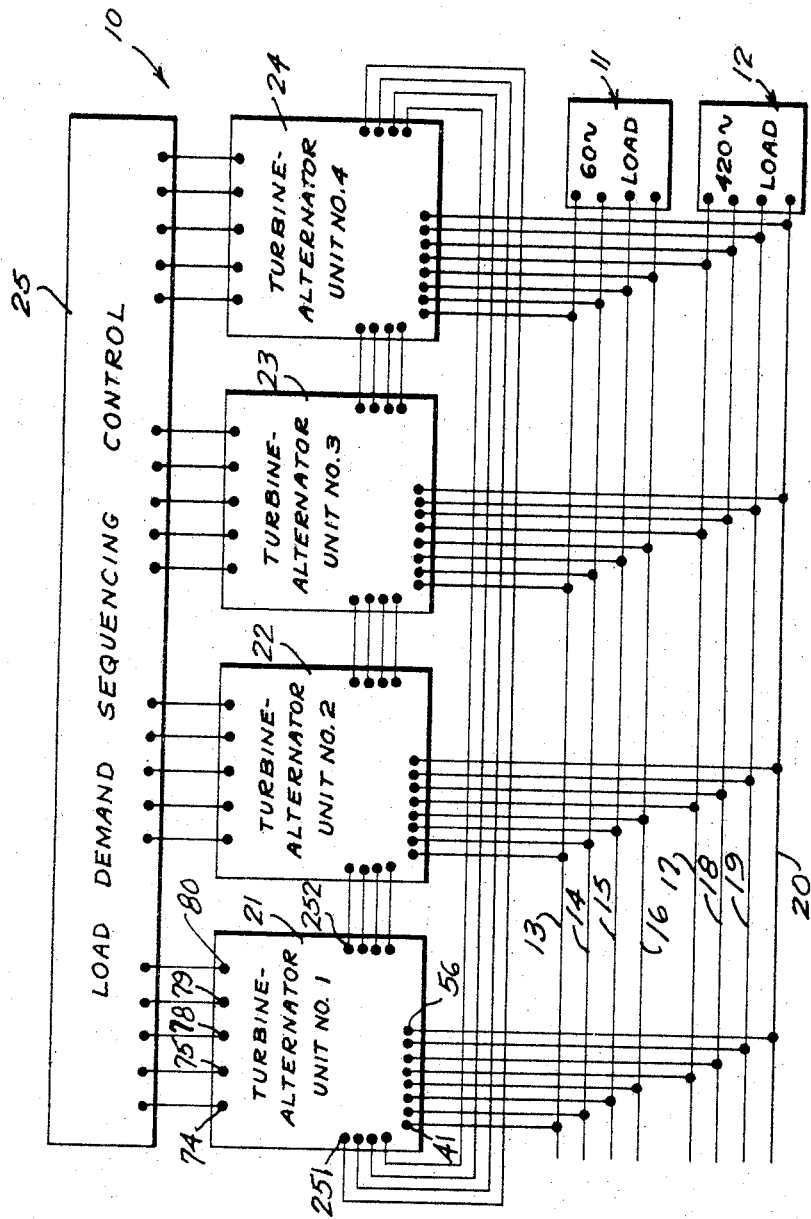
FIGURE 1 is a block diagram of an electrical power generating system constructed according to the principles of this invention and including four turbine-alternator units.

Reference numeral 10 generally designates an electrical power generating system constructed according to the principles of this invention and arranged for supplying 60 cycle, three phase AC current to a load 11 and 420 cycle, three phase AC current to a load 12, from A, B and C phase and neutral buses 13, 14, 15 and 16 connected to the 60 cycle load 11 and A, B and C phase and neutral buses 17, 18, 19 and 20 connected to the 420 cycle load 12.

The illustrated system comprises four turbine-alternator units 21, 22, 23 and 24 of identical construction, respectively designated also as unit No. 1, unit No. 2, unit No. 3 and unit No. 4. Each unit has eight output terminals connected to the buses 13–20 and five terminals connected to a load demand sequencing control 25 which is not part of the present invention but is disclosed and claimed in our copending application entitled "Alternator Load Demand Sequencing System," Patent No. 3,300,647, issued Jan. 26, 1967.

The load demand sequencing control 25 automatically schedules the operation in a manner such that the running times of the units are equalized. In brief, it operates when the load is less than 40% of the capacity of one unit to stop the unit having the greatest running time and it operates when the total load is greater than 90% of the capacity of one unit to start the unit having the least running time.

Each of the units 21–24 adidtionally has terminals connected to sensing circuits within the units and interconnected with like terminals of the other units to obtain real and reactive load balance among those units in operation, as described in detail hereinbelow.

Figure 2:
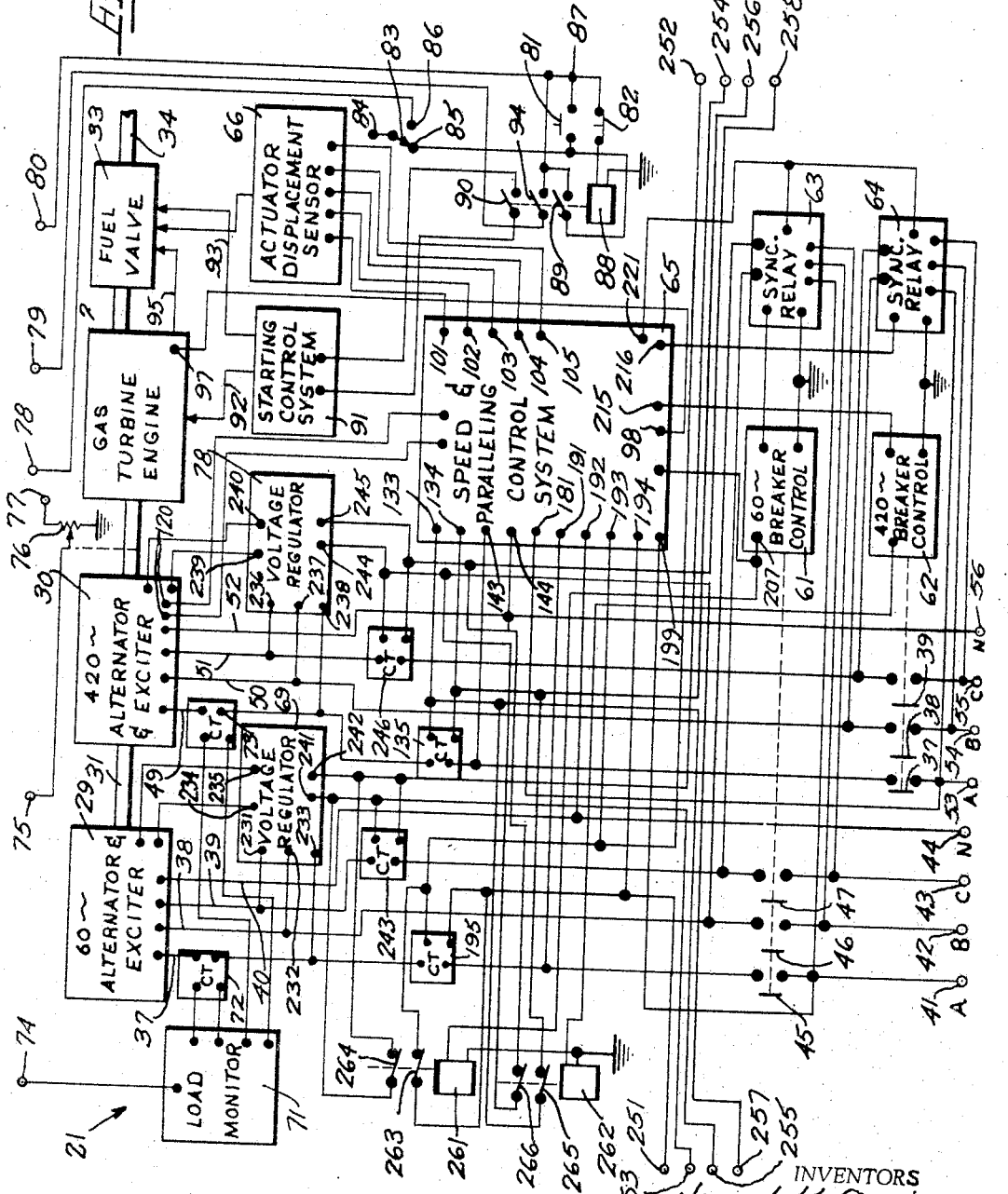
FIGURE 2 is a schematic diagram of one of the turbine-alternator units of the system of FIGURE 1, the other units being identical thereto.

FIGURE 2 shows the construction of the turbine-alternator unit 21, the construction of the other units 21–24 being identical thereto. As shown, a 60 cycle alternator 29 and a 420 cycle alternator 30 are driven from a common shaft 31 which is driven by a gas turbine engine 32 to which fuel is supplied through a valve 33 from a supply line 34. The 60 cycle alternator 29 has A, B and C phase output buses 37, 38 and 39 and a neutral bus 40 connected to output terminals 41, 42, 43 and 44, the connection of the phase buses 37–39 being through breaker contacts 45, 46 and 47. Similarly, the 420 cycle alternator 30 has A, B and C phase buses 49, 50 and 51 and a neutral bus 52 connected to output terminals 53, 54, 55 and 56, with breaker contacts 57, 58 and 59 in the phase bus connections.

The breaker contacts 45–47 and the breaker contacts 57–59 are operated by 60 cycle and 420 cycle breaker controls 61 and 62 which are connected to synchronizing relays 63 and 64 and also to a speed and paralleling control system 65. The system 65 operates in response to certain speed, current and voltage signals to control through an actuator and displacement sensor unit 66 a section of the fuel valve 33, in a manner to control acceleration of the alternators to the proper speed and to proper phase relation to the voltages on the main buses 13–20, and to operate the breaker contacts 45–47 and 57–59 at the proper times to place the unit on the line. The system 65 also operates to maintain proper load division among alternators on the line and to perform other functions as described below.

The unit 21 as illustrated in FIGURE 2 additionally comprises a 60 cycle voltage regulator 69 and a 420 cycle voltage regulator 70 which respond to current and voltage signals and control exciters incorporated in the alternators 29 and 30, to control the field excitation of the alternators and thereby control the output voltages.

The unit 21 further has a load monitor circuit 71 having two inputs connected to current transformers 72 and 73 in the 60 cycle and 420 cycle A buses 37 and 49, and having an output connected to a terminal 74 which is connected to the load demand sequencing control 25. Another terminal 75, connected to the load demand sequencing control 25, is connected to the movable contact of a potentiometer 76 connected between ground and a constant voltage terminal 77, the contact of the potentiometer 76 being mechanically driven from the shaft 31 through a gear reduction, such that its position and hence the voltage thereof indicate the accumulated running time of the unit. Additional terminals 78, 79 and 80 are connected to the load demand sequencing control 25 and are also connected to starting control circuitry of the unit in a manner such that the unit may be started and stopped automatically from the sequencing control 25.

The unit 21 may be started and stopped manually, rather than automatically, by operation of start and stop push buttons 81 and 82. Manual or automatic control is selected by a selector switch contact 83 connected to a voltage supply terminal 84 and selectively engageable with a contact 85 connected to the manual start switch, or with a contact 86 connected to the terminal 78. With contact 83 in the manual position as illustrated, depression of the start button 81 supplies voltage to a circuit point 87 which is connected through the stop switch 82 to a relay 88, to thereby energize the relay 88. A holding contact 89 is then closed and another contact 90 is closed to complete a circuit in a starting control system 91 which is connected to the engine 32 and to the fuel valve 33 as diagrammatically illustrated by the lines 92 and 93. It may be noted that for automatic operation, the contact 83 is engaged with the contact 86 and a circuit is completed in the sequencing control 25 to connect terminals 78 and 80 together and to thereby energize the relay 88, after which a holding circuit is completed through a contact 94 of the relay 88 connected between circuit point 87 and the terminal 79. To automatically stop operation the holding circuit may be opened within the sequencing control 25. The operation may also be stopped at all times by depression of the stop button 82 to open the circuit to the relay 88, regardless of the position of the selector switch 83.

The construction of the starting control system 91 is not illustrated in detail since it is known in the art, but the general mode of its operation will be described, to facilitate an understanding of various features of the invention as described below. In brief, when the start relay 88 is energized to close the contact 90, a circuit is completed in the system 91 and various functions are then performed in sequence. First, a purge cycle is initiated wherein the engine 32 is cranked at a relatively low speed to get rid of any excessive amounts of gas that may have collected therein. The engine 32 is then cranked at a higher speed while an ignition system is activated and when the temperature reaches a certain value, a section of the fuel valve 33 is opened, through the control line 93 as diagrammatically illustrated, to supply the main operating gas to the engine 32. The engine then accelerates on what is termed as a fuel schedule, wherein a section of the fuel valve 33 is controlled in response to compressor discharge pressure in the engine 32 through a line 95 as diagrammatically illustrated, to limit acceleration to a predetermined safe value.

When the engine speed reaches approximately 90% of the rated speed, the fuel acceleration limiting action is removed and at the same time, a centrifugal switch or the like driven by the engine 32 develops a signal at a terminal 97 which is connected to a terminal 98 of the speed and paralleling control system 65. System 65 then controls acceleration of the engine 32, by controlling a section of the fuel valve 33 through the unit 66. Initially the system 65 operates with a type of action referred to as proportional action, wherein the speed is brought up to a speed close to rated speed, without danger of overshooting or any form of oscillation or instability. Then, after a time delay, an integral or rate control action is used to bring the speed to the exact rated value.

After the proper speed is reached, the phase of the output of the alternator 29 is compared with the phase on the main 60 cycle buses 13–16 until synchronization is established. The 60 cycle breaker control 61 may then be energized through the synchronizing relay 63 to close the 60 cycle breaker contacts 45–47.

After the 60 cycle alternator 29 is thus placed on the line, load division or load sharing circuitry is brought into operation to balance the load between units which are then on the line. This is accomplished before bringing the 420 cycle alternator 30 on the line and is very important in insuring that synchronization will take place on the proper cycle of the 420 cycle voltage. In any event, after a time delay sufficient for the 60 cycle load sharing operation, the 420 cycle breaker control 62 may be energized to close the contacts 57–59, if a 420 cycle phase discriminator indicates a displacement angle between the 420 cycle alternator output and the line below a certain value. The output of the phase discriminator may be observed on a meter, and the breaker control 62 may be manually controlled, or the operation may be performed automatically by the synchronizing relay 64. It may be noted that it also is possible to manually control the 60 cycle breaker control 61, as well as controlling it automatically from the synchronizing relay 63.

Figure 3:
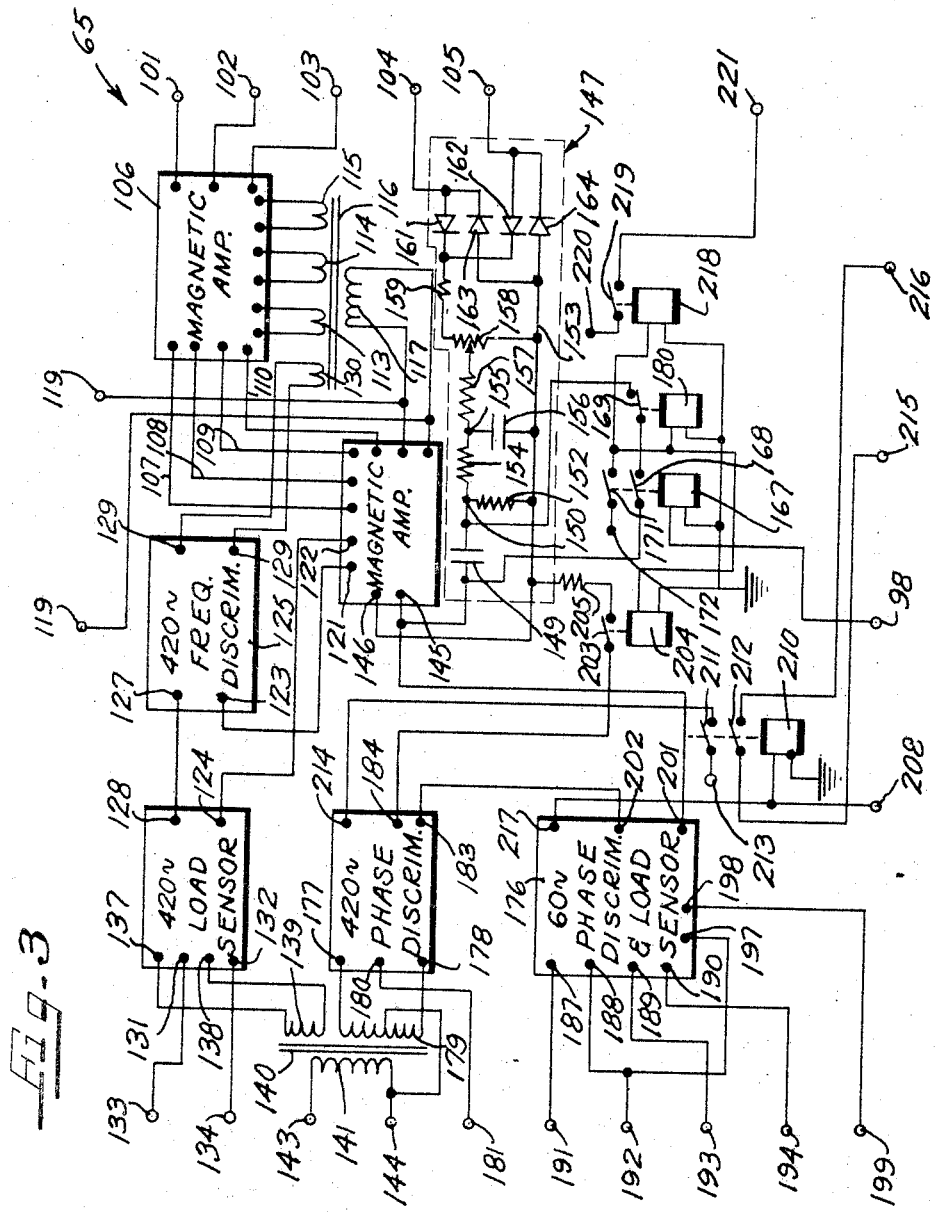
FIGURE 3 is a schematic diagram of a speed and parallelling control system of the unit illustrated in FIGURE 2.

Referring to FIGURE 3, the control system 65 has five terminals 101–105 connected to the actuator and displacement sensor unit 66. Terminals 101 and 103 are connected to output terminals of a magnetic amplifier 106 which supplies electrical power to the actuator portion of the unit 66 to control operation of a section of the fuel valve 33, the valve being moved toward its open position when the voltage on terminal 101 is greater than that on terminal 103 and being moved toward its closed position when the voltage on terminal 103 is greater than that on terminal 101. Terminals 104 and 105 are connected to the output of the displacement sensor portion of the unit 66, which develops a signal proportional to the amount of movement of the valve in one direction away from a certain position. The unit 66 may preferably have a construction as illustrated in the Guth Patent No. 2,790,092, issued Apr. 23, 1957.

The magnetic amplifier 106 has four input terminals connected through lines 107 and 110 to output terminals of another magnetic amplifier 112 which additionally has three pairs of terminals connected to secondary windings 113 and 115 of a transformer 116 having a primary winding 117 to which 420 cycle power is applied to operate the amplifier 106, the same power being also applied to a pair of input terminals 118 of the magnetic amplifier 112. This 420 cycle power is derived from a pair of terminals 119 which are connected to terminals 120 of the alternator 30, terminals 120 being connected to an auxiliary section of the alternator 30.

The magnetic amplifier 112 has a first pair of input terminals 121 and 122 which are respectively connected to output terminals 123 and 124 of a 420 cycle frequency discriminator 125 and a 420 cycle load sensor 126, a second output terminal 127 of the frequency discriminator 125 being connected to a second output terminal 128 of the load sensor 126, so that the outputs of the frequency discriminator 125 and the load sensor 126 are connected in series to the first input of the magnetic amplifier 112. The frequency discriminator 125 has a pair of input terminals 129 connected to an additional secondary winding 130 of the transformer 116, a signal being thus supplied to terminals 130 having a frequency equal to the output frequency of the alternator 30. As described below, the frequency discriminator 125 develops at the output terminals 123 and 127 a DC voltage having a magnitude and polarity corresponding to the amount and direction of deviation of the frequency from a certain value, in this case 420 cycles.

The load sensor 126 has a pair of input terminals 131 and 132 connected to terminals 133 and 134 which as shown in FIGURE 2 are connected to the output of a current transformer 135 in the 420 cycle phase A bus 49. Another pair of input terminals 137 and 138 of the load sensor 126 are connected to a secondary winding 139 of an isolation transformer 140 having a primary winding 141 connected to a pair of terminals 143 and 144 as shown in FIGURE 2, terminal 143 is connected to the 420 cycle phase A bus 49, while terminal 144 is connected to the 420 cycle neutral bus 52. Thus voltage and current signals are applied to the inputs of the load sensor 126 and as described below, a DC voltage is developed between output terminals 124 and 128 proportional to the load on the 420 cycle alternator 30.

It may be here noted that during the initial starting operation, the load sensor 126 produces no output and the input signal to terminals 121 and 122 of the magnetic amplifier 112 is dependent solely on the output of the frequency discriminator and through the magnetic amplifiers 112 and 106 and the unit 66, the fuel valve 33 is so controlled that the alternator is brought to a speed approximately equal to the desired speed, after which the 60 cycle alternator and the 420 cycle alternator are sequentially placed on the line in the manner as briefly described above. The load sensor 126 then develops an output voltage which functions to maintain proper load division or load sharing among the alternators on the line. The frequency discriminator 125 remains functional in insuring that the output frequency is substantially equal to the desired output frequency.

The magnetic amplifier 112 has a second pair of input terminals 145 and 146 which are connected to the terminals 104 and 105 through a rate feedback circuit 147. As shown, terminal 145 is connected through a capacitor 149 to a circuit point 150 which is connected through a resistor 152 to a line 153 connected to the terminal 146. Circuit point 150 is also connected through a resistor 154 to a circuit point 155 connected through a capacitor 156 to the line 153 and also connected through a resistor 157 to the movable contact of a potentiometer 158 having one terminal connected to the line 153 and having a second terminal connected through a resistor 159 to a circuit point 160. Circuit point 160 is connected through diodes 161 and 162 to the terminals 104 and 105 while line 153 is connected to the terminals 104 and 105 through a second pair of diodes 163 and 164.

In operation, an AC signal is applied to the terminals 104 and 105 proportional to the displacement of a valve member in the valve 33 from a certain position. Diodes 161–164 convert the signal to a DC signal, the circuit point 160 being positive relative to the line 153. A portion of the signal so derived, dependent upon the adjustment of the potentiometer 158, is applied through the network consisting of resistors 152, 154 and 157 and the capacitor 156, wherein high frequency components are removed.

In normal operation, the capacitor 149 is in the circuit and it performs a differentiating function, to apply to the input terminals 145 and 146 a feedback signal proportional to the rate of movement of the valve member, and the speed of response of the system is increased. However during starting, and particularly when moving from 90% of rated speed toward the rated speed, the use of the capacitor is undesirable in that it tends to produce overshooting and instability. In the illustrated system of this invention, means are provided for shorting out the capacitor 149 to obtain a type of action referred to as proportional action, as opposed to an integral action obtained with the capacitor in the circuit.

In particular, when the 90% speed signal is applied to terminal 98, a relay 167 is energized to cause a contact 168 connected in series with a normally closed contact 169 of a relay 170 across the capacitor 149. At the same time, another contact 171 of the relay 167 is closed to apply a voltage from a supply voltage terminal 172 to the relay 170 to thereby energize the relay 170. Relay 170 operates as a time delay relay to open the contact 169 after a certain time interval sufficient to allow the speed of the alternators to move from 90% speed up to a value approximately equal to rated speed. This time interval may preferably be on the order of five seconds. When contact 169 is then opened, the capacitor 149 is again placed in the circuit to obtain the integral action and the high speed of response.

The input terminals 145 and 146 of the magnetic amplifier 112 are additionally connected to outputs of a 420 cycle phase discriminator 175 and a circuit 176 which is selectively operable either as a 60 cycle phase discriminator or as a 60 cycle load sensor circuit, such dual operation being employed to conserve on the number of components, because both functions are not performed simultaneously.

Initially, the circuit 176 operates as a 60 cycle phase discriminator for synchronizing the phase of the unit with the phase of the main line, after which the breakers 45–47 are closed by the control 61 to place the 60 cycle alternator 29 on the line. Thereafter, the circuit 176 operates as a load sensor circuit in obtaining load sharing or load division among those 60 cycle alternators on the line. The 420 cycle phase discriminator then operates in synchronizing the proper phase of the 420 cycle alternator with the 420 cycle line, after which the 420 cycle breaker contacts 57–59 are operated to place the 420 cycle alternator on the line.

The 420 cycle phase discriminator has input terminals 177 and 178 connected to a secondary winding 179 of the transformer 140, the winding 179 having a center tap connected to the terminal 144. The phase discriminator 175 has an additional input terminal 180 connected to a terminal 181 which as shown in FIGURE 2 is connected to the output terminal 53 to be connected to the main A bus 17. With this arrangement, AC voltages are applied between terminals 177 and 180 and between terminals 178 and 180 which are proportional to the vector sum and vector difference of the phase A main line voltage and the phase A output voltage of the unit to be paralleled. The phase discriminator 175 operates in response to such signals to develop a DC voltage between a pair of output terminals 183 and 184 which has a magnitude and polarity dependent upon the magnitude and direction of phase difference between the applied voltages.

The 60 cycle phase discriminator and load sensor circuit 176 has input terminals 187–190 connected to terminals 191–194 which as shown in FIGURE 2 are respectively connected to the 60 cycle bus 37, the 60 cycle neutral bus 40, and output terminals of a current transformer 195 in the 60 cycle A phase bus 37. The circuit 176 has an additional pair of input terminals 197 and 198 respectively connected to the terminal 192 and a terminal 199 which is connected to the terminal 41 to be connected to the main 60 cycle A phase bus 13.

The circuit 176 has a pair of output terminals 201 and 202 and, when operated as a phase discriminator, it develops between such output terminals a DC signal having a magnitude and polarity corresponding to the magnitude and direction of the phase difference between the output of the 60 cycle alternator 29 and the main line voltage. When it is operated as a load sensor, a DC output signal is developed proportional to the load on the 60 cycle alternator 29.

Output terminal 201 of the circuit 176 is connected directly to the input terminal 145 of the magnetic amplifier 112 while output terminal 202 is connected directly to the output terminal 183 of the 420 cycle phase discriminator 125. The other output terminal 184 of the phase discriminator 175 is connected through a contact 203 of a relay 204 and through a resistor 205 to the input terminal 146 of the magnetic amplifier 112. Relay 204 is connected in parallel with the relay 170 to be energized and to close the contact 203 when the speed reaches the desired value. At that time, the circuit 176 operates as a phase discriminator, while the 420 cycle phase discriminator 175 is inoperative, a signal being thereby applied to the magnetic amplifier 112 to control through the magnetic amplifier 106 and the unit 66 the operation of the fuel valve 33 in a manner such as to synchronize the output of the 60 cycle alternator 29 with the main line. The 60 cycle breaker control 61 may then be operated from the synchronizing relay 63 to close the 60 cycle breaker contacts 45–47.

When the 60 cycle breaker control 61 is energized, a signal is applied from an output terminal 207 thereof to an input terminal 208 of the system 65, terminal 208 being connected to a relay 210 having two contacts 211 and 212. Contact 211 is connected to a power supply terminal 213 and a terminal 214 of the 420 cycle phase discriminator 175 and when contact 211 is closed, a time delay relay within the discriminator 175 is energized to render the discriminator operative after a certain time interval, preferably on the order of ten seconds. Contact 212 is connected to terminals 215 and 216 which, as illustrated in FIGURE 2, are connected between the output of the synchronizing relay 64 and the input of the 420 cycle breaker control.

Terminal 208 is additionally connected to a terminal 217 of the circuit 176 and when a signal is applied to the terminal 208 from the 60 cycle breaker control 61, a pair of relays within the circuit 176 are energized to shift the operation of the circuit from the phase discriminator mode to the load sensor mode.

With the circuit 176 operative in the load sensor mode, a signal is applied to the input terminals 145 and 146 of the magnetic amplifier 112, and to like terminals of the magnetic amplifiers of the other units in a manner to obtain substantially equal load division among the 60 cycle alternators on the line. The 420 cycle phase discriminator 175 is thereafter made operative and a signal is applied therefrom to the input terminals 145 and 146 of the magnetic amplifier 112 to synchronize the output of the 420 cycle alternator 30 with the line voltage. The 420 cycle breaker control 62 may then be operated from the synchronizing relay 64, through the contact 212 of the relay 210, to operate the 420 cycle breaker contacts 57–59, and to place the 420 cycle alternator on the line.

It should be here noted that an additional relay 218 is connected in parallel with the relays 170 and 204, and has a contact 219 connected between a power supply terminal 220 and a terminal 221 which as shown in FIGURE 2 is connected to inputs of the synchronizing relays 63 and 64, to render such relays in condition for operation when the alternators are brought up to the rated speed.

In addition to control of the drive torque applied to the alternators, through control of the fuel valve 33 by the unit 66, controlled from the system 65, it is also very important that the voltage outputs of the alternators be properly regulated. Such regulation is performed by the voltage regulators 69 and 70. As shown in FIGURE 2, the voltage regulator 69 has input terminals 231, 232 and 233 connected to the A, B and C 60 cycle phase buses 37–39 and output terminals 234 and 235 which are connected to the exciter for the alternator 29, to control the field excitation thereof. Similarly, the voltage regulator 70 has input terminals 236, 237 and 238 connected to the A, B and C 420 cycle buses 49–51 and output terminals 239 and 240 connected to the exciter for the 420 cycle alternator 30.

The voltage regulator 69 additionally has a pair of input terminals 241 and 242 connected to the output of a current transformer 243 in the 60 cycle C phase bus 39, while the voltage regulator 70 is similarly provided with a pair of input terminals 244 and 245 connected to the output of a current transformer 246 in the 420 cycle C phase bus 51.

The input terminals 241, 242 and 244, 245 are arranged also for interconnection with the input terminals of the voltage regulators of the other units, in a manner to obtain proper reactive load division between alternators. In addition, interconnections are provided between the inputs to the load sensor circuits of the system 65, and those of other units, in a manner to obtain division of the real loads on the alternators on the line. With respect to the requirements for real and reactive load division in a system of paralleled alternators, it can be shown that the reactive load balance is primarily maintained by control of field excitation which is a function of the voltage regulators, and it can also be shown that the real load division must be controlled by adjustment of the power or torque delivered by the prime movers which is a function of the system used to control the fuel valve 33 as above described.

As shown in FIGURE 2, a pair of terminals 251 and 252 are connected to the output of the current transformer 195 and also to the terminals 193 and 104 of the system 65, so as to be connected to the input of the 60 cycle load sense circuit 176 therein. As shown in FIGURE 1, terminals 251 and 252 are connected to similar terminals of the other units, in a manner such that the current sense inputs of all of the units are connected in series. In a similar manner, a pair of input terminals 253 and 254 are connected to the input terminals 241 and 242 of the 60 cycle voltage regulator 69. Another pair of terminals 255 and 256 are connected to the terminals 133 and 134 of the system 65, to be connected to the current sense input of the 420 cycle load sensor 126, and a fourth pair of terminals 257 and 258 are connected to the input terminals 244 and 245 of the 420 cycle voltage regulator 70.

The respective current sense inputs to the load sensors and voltage regulators are shorted out when the units are not in operation, to permit proper operation of the other units on the line, by means of a pair of relays 261 and 262 respectively connected to the outputs of the 60 cycle and 420 cycle breaker controls 61 and 62. Relay 261 has a first normally closed contact 263 connected between terminals 251 and 252 and a second normally closed contact 264 connected between terminals 253 and 254. Similarly, relay 262 has a first normally closed contact 265 connected between terminals 255 and 256 and a second normally closed contact 266 connected between terminals 257 and 258. Accordingly, until the breaker controls 61 and 62 are operated, the respective voltage and load responsive circuits are not placed in series with the circuits of the other units in operation.

Figure 4:
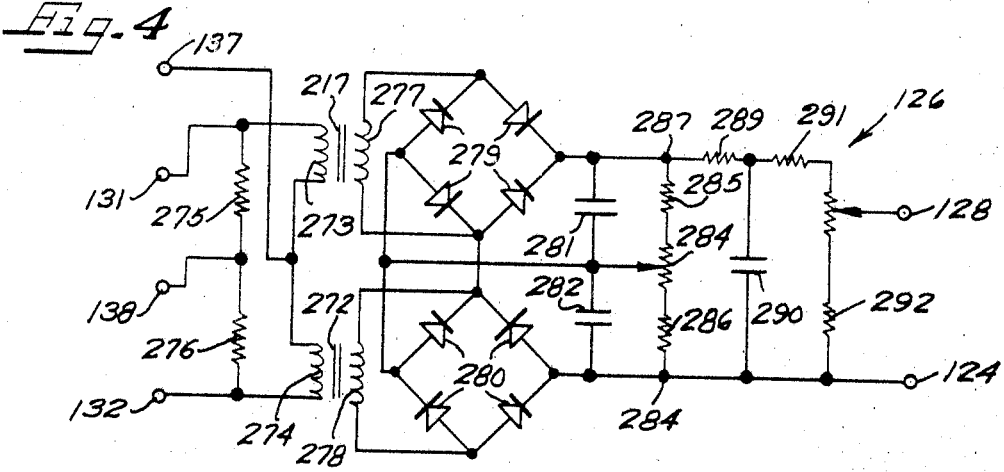
FIGURE 4 is a circuit diagram of a 420 cycle load sensor of the circuit of FIGURE 3.

Referring to FIGURE 4, the 420 cycle load sensor 126 comprises a pair of transformers 271 and 272 having primary windings 273 and 274 connected between the terminals 131 and 132 and the terminal 137, with a pair of resistors 275 and 276 of equal value being connected between the terminals 131 and 132 and the terminal 138. With this arrangement, voltages are applied to the primary windings 273 and 274 which are respectively proportional to the vector sum and the vector difference of voltages proportional to line voltage and line current. The transformers 271 and 272 have secondary windings 277 and 278 respectively connected to a first bridge rectifier having four diodes 279 and a second bridge rectifier having four diodes 280. A pair of capacitors 281 and 282 are connected across the outputs of the rectifiers and are connected in series, the junction therebetween being connected to the movable contact of a potentiometer 284 connected through resistors 285 and 286 to circuit points 287 and 288 which are connected to the other terminals of the capacitors 281 and 282. Potentiometer 284 is adjustable to obtain proper balance.

With this arrangement, there is developed between the circuit points 287 and 288 a voltage proportional to power which is applied through a filter circuit comprising a resistor 289 and a capacitor 290, the signal across the capacitor 290 being applied through resistors 291 and 292 to a potentiometer 293 having a movable contact connected to the output terminal 128 with output terminal 124 being connected to the circuit point 288.

Figure 5:
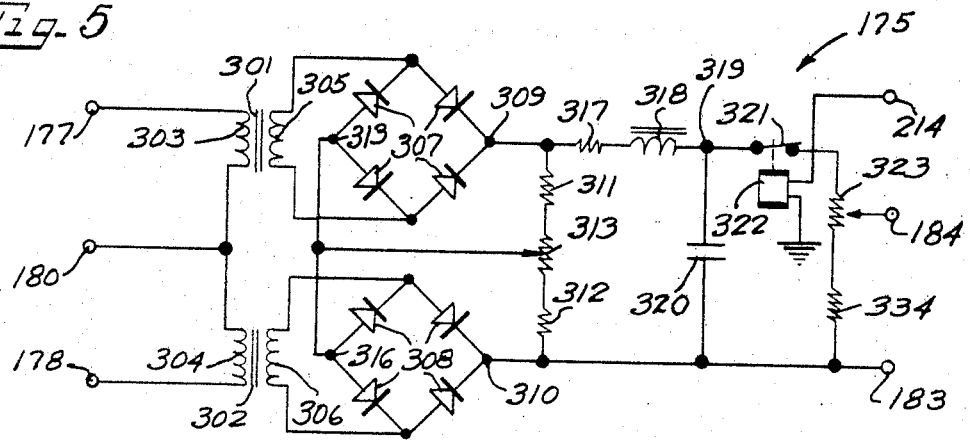
FIGURE 5 is a circuit diagram of a 420 cycle phase discriminator of the circuit of FIGURE 3.

FIGURE 5 shows the circuit of the 420 cycle phase discriminator 175. As shown, a pair of transformers 301 and 302 are provided having primary windings 303 and 304 connected between input terminals 177 and 178 and the input terminal 180 and having secondary windings 305 and 306 connected respectively to a first bridge rectifier composed of four diodes 307 and a second bridge rectifier composed of four diodes 308. Circuit points 309 and 310 at the outputs of the bridge rectifiers are connected together through resistors 311 and 312 and a potentiometer 313. The movable contact of the potentiometer 313 is connected to other circuit points 315 and 316 of the bridge rectifiers, and forms a balancing adjustment control. Circuit point 309 is additionally connected through a resistor 317 and a choke 318 to a circuit point 319 which is connected through a filter capacitor 320 to the circuit point 310. Circuit point 319 is connected through a contact 321 of a time delay relay 322 to one terminal of a potentiometer 323 the other terminal of which is connected to circuit point 310 and also to the output terminal 183 through a resistor 324. The movable contact of potentiometer 323 is connected to the output terminal 184.

In operation, an energizing signal is applied to terminal 214, when relay 210 is energized in response to operation of the 60 cycle breaker control 61, and after a certain time interval, preferably on the order of ten seconds, the contact 321 is closed, whereupon an output voltage is produced between terminals 183 and 184 proportional to the difference in the outputs of the two bridge rectifiers. If the output voltage of the 420 cycle alternator 30 is in phase with the 420 cycle line voltage, the outputs of the two bridge rectifiers are equal, and no net output voltage is produced. However, if there is a phase lead or a phase lag of the alternator output voltage relative to the line voltage, an output voltage of one polarity or the other is produced proportional to the magnitude of the phase difference.

Figure 6:
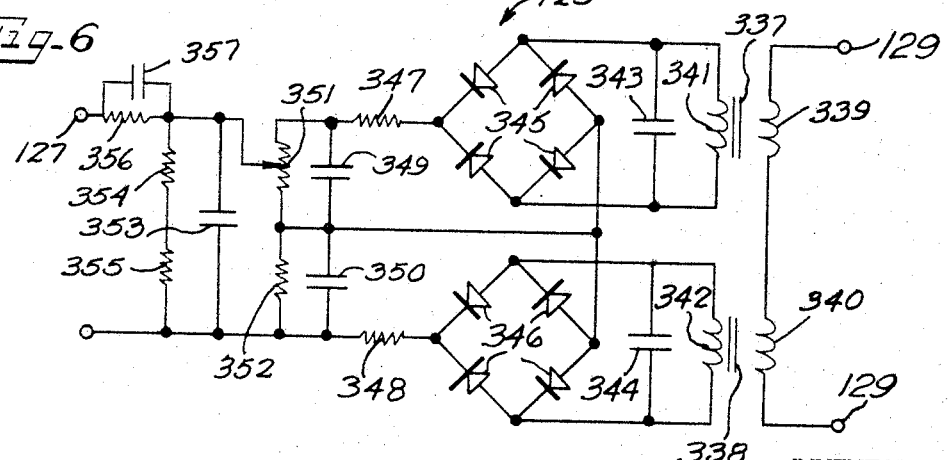
FIGURE 6 is a circuit diagram of a 420 cycle frequency discriminator of the circuit of FIGURE 3.

FIGURE 6 shows the circuit of the 420 cycle frequency discriminator 125. A pair of transformers 337 and 338 are provided having primary windings 339 and 340 connected in series to the input terminals 130 and having secondary windings 341 and 342 having tuning capacitors 343 and 344 connected thereacross and connected also to a first bridge rectifier composed of four diodes 345 and a second bridge rectifier composed of four diodes 346. The outputs of the bridge rectifiers are applied through resistors 347 and 348 to filter circuits connected in series, comprising capacitors 349 and 350 and resistors 351 and 352, one output terminal of the circuit being connected to the output terminal 123. The resistor 351 is in the form of a potentiometer having a movable contact connected through a capacitor 353 to the terminal 123 with a resistor 354 and an adjustable resistor 355 connected across the capacitor 353. The movable contact of a potentiometer 351 is additionally connected through the parallel combination of a resistor 356 and a capacitor 357 to the output terminal 127.

In operation, the tuned circuits composed of the secondary windings 341 and 342 and the capacitors 343 and 344 are respectively resonant at frequencies above and below the desired frequency (420 cycles), so that a null output is produced at that frequency. At frequencies below that frequency, an output voltage of one polarity is produced while at frequencies above that frequency, an output voltage of the reverse polarity is produced.

FIGURE 7 shows the circuit of the phase discriminator and load sensor 176 which initially operates as a phase discriminator in accomplishing paralleling of the 60 cycle alternator, but thereafter is operated as a load sensor in obtaining division of the load among the 60 cycle alternators, before paralleling of the 420 cycle alternators. The circuit comprises a pair of relays 361 and 362 connected in parallel and to the terminal 217. When the relays 361 and 362 are deenergized, the circuit operates as a phase discriminator, but when the relays 361 and 362 are energized, the circuits operate as a load sensor.

Input terminals 187 and 188 are connected to a primary winding 363 of a transformer 364 having a center-tapped secondary winding 365, the center tap being connected to the terminal 197 which is externally connected to the terminal 188 as shown in FIGURE 3. The end terminals of the secondary winding 365 are connected through normally closed contacts 367 and 368 to terminals of primary windings 369 and 370 of a pair of transformers 371 and 372. The other terminals of the primary windings 369 and 370 are connected through a normally closed contact 373 of the relay 362 to the input terminal 198.

The transformers 371 and 372 have secondary windings 375 and 376 connected to a first bridge rectifier composed of four diodes 377 and a second bridge rectifier composed of four diodes 378. Output terminals of the bridge rectifiers are connected through resistors 379 and 380 to a potentiometer 381 having a movable contact connected to other output terminals of the rectifiers. The output terminal of the second rectifier which is connected to the resistor 380 is also connected to the output terminal 201 while the output terminal of the first rectifier which is connected to the resistor 379 is connected through a resistor 382 to a circuit point 383 connected through a capacitor 384 to terminal 201 and connected through a resistor 385 to a potentiometer 386, connected through a resistor 387 to the terminal 201. The movable contact of the potentiometer 386 is connected to the output terminal 202.

This circuit as thus far described is thus substantially the same as that of the 420 cycle phase discriminator 175, shown in FIGURE 5, and it operates in the same manner as described above.

For operation as a load sensor, the relays 361 and 362 are energized, by application of a signal to the terminal 217. Terminals of the primary windings 369 and 370 are then connected through contacts 391 and 392 of the relay 361 to the input terminals 189 and 190. The other terminals of the windings 368 and 370 are connected together and through a contact 393 of the relay 362 to one end terminal of the secondary winding 365. The other end terminal of the winding 365 is then connected through a contact 394 of the relay 362 to a circuit point 395 which is connected through resistors 397 and 398 to the input terminals 189 and 190. When so connected, the circuit is essentially the same as that of the 420 cycle load sensor 126 as described above in connection with FIGURE 4, and its operation is substantially the same as described above.

FIGURE 8 shows the circuit of the 60 cycle voltage regulator 69. The 420 cycle regulator 70 is not illustrated but is substantially the same as the regulator 69.

In general, the voltage regulator 69 controls the field of the 60 cycle exciter to maintain the output voltage at the desired level and also to maintain reactive loads balanced during parallel operation.

The circuit comprises an input circuit generally designated by reference numeral 400 which senses the alternator output voltage plus a signal indicative of the reactive load unbalance in parallel mode operation, to develop a signal which is amplified and compared to a reference signal in a bridge circuit generally designated by reference numeral 401 and including a transistor 402. Any error voltage developed by the bridge circuit 401 is amplified by transistors 403 and 404 and applied to a unijunction transistor 405 which operates as a pulse position modulator synchronized to the power line frequency. The pulse position modulator controls the firing angle of a bridge circuit 406 including two silicon controlled rectifiers 407 and 408, operative to supply power to the alternator field which is connected to the terminals 234 and 235.

The input circuit 400 comprises three step-down transformers 411, 412 and 413 having primary windings 414, 415 and 416 connected between a terminal 417, which is connected to the 60 cycle neutral bus 40, and terminals 231, 232 and 233 connected to the A, B and C phase buses 37, 38 and 39. The transformers 411–413 have secondary windings 418–420 connected through diodes 421–423 to a conductor 424, and connected through diodes 425, 426 and 427 to a conductor 428 which serves as a ground or reference potential point of the system. With this circuit, a rectified voltage is developed between the conductors 424 and 428 proportional to the output voltage of the 60 cycle alternator. The output voltage so developed is, however, modified in accordance with a signal indicating the reactive load balance, which is applied between the secondary winding 418 and the diodes 421, 425 from the input terminals 241 and 242 which are connected to the current transformer 243 in the C phase bus 39 as illustrated in FIGURE 2. An inductor 429 is connected between the terminals 241 and 242, across the secondary of the current transformer 243, to provide a necessary 90° phase shift.

The rectified voltage between conductors 424 and 428 is applied to a filter comprising a resistor 431 and a capacitor 432 connected in parallel between conductor 424 and a conductor 433, and a capacitor 434 connected between conductors 433 and 428.

The comparison bridge circuit 401 comprises a reference Zener diode 436 connected between the emitter of transistor 402 and the conductor 428, a resistor 437 connected between the emitter of transistor 402 and the conductor 433, a resistor 438 connected between the base of transistor 402 and the contact of a potentiometer 439 connected between the conductors 428 and 433, a resistor 440 connected between the base and collector of the transistor 402, and a resistor 441 connected between the collector of transistor 402 and the conductor 433.

In normal operation, the transistor 402 is partially cut off because the incoming DC signal between conductors 428 and 433 is of sufficient magnitude to forward bias the base of the transistor 402. If the input DC signal should increase or decrease because of a change in the alternator output voltage or due to reactive load unbalance in parallel mode operation, then the base of transistor 402 is biased proportionately causing its emitter current to increase or decrease. The Zener diode 436 serves as a voltage reference with the potentiometer 439 and the resistor 441 forming the rest of the bridge circuit. Resistor 440 provides negative feedback while resistor 437 serves as a loading resistor for the Zener reference diode 436. Potentiometer 439 is adjustable to provide the necessary reference voltage adjustment for the base of transistor 402, while resistor 438 is adjustable to provide the necessary gain required for the voltage regulator.

The output of the comparison bridge circuit 401 is applied through a Zener diode 443 and a resistor 444 to the base of the transistor 403, the base being also connected through a resistor 445 to the conductor 428. The emitter of the transistor 403 is connected through a resistor 446 to the conductor 428, while the collector thereof is connected through a resistor 447 to a conductor 448 and also directly to the base of the transistor 404. The collector of the transistor 404 is connected through a capacitor 449 to the conductor 428 while the emitter thereof is connected through a resistor 450 to the conductor 448. The collector of transistor 404 is connected to the emitter of the unijunction transistor 405, with the base electrodes of the unijunction transistor 405 being connected through resistors 451 and 452 to the conductors 428 and 448.

In operation, if transistor 402 in the bridge circuit 401 is completely bias off, the transistor 403 is biased full on through the base bias circuit consisting of the resistors 441, 444 and 445 and the Zener diode 443. The base of the transistor 404 is forward biased by the conduction of transistor 403, causing the transistor 404 to be full on. The capacitor 449 is charged up through the resistor 450 with a time constant that is a function of the values of the capacitor 449 and the resistor 450.

If the transistor 402 is in partial conduction because of a bridge unbalance caused by a change in input signal, the potential of the base of the transistor 403 is lowered, causing the transistor 403 to partially conduct. The reduction of the collector current of the transistor 403 reduces the forward base bias of the transistor 404 to cause it to partially conduct. This in turn increases the effective time constant in the circuit of the capacitor 449 and the resistor 450. When the capacitor 449 charges up to a given voltage, the unijunction transistor 405 fires to conduct current through the resistors 451 and 452.

Accordingly, the unijunction transistor 405 is fired at a predetermined time after application of voltage to the conductor 448, depending upon the output of the comparison bridge circuit 401.

The output of the pulse position modulator is applied through a conductor 454 and through coupling capacitors 455 and 456 to the gates of the silicon controlled rectifiers 407 and 408. Resistors 457 and 458 are connected between the gates of the rectifiers 407 and 408 and the output terminal 234 which is connected also to the cathodes of the rectifiers 407 and 408 and to the conductor 428. The anodes of the rectifiers 407 and 408 are connected through rectifiers 459 and 460 to the output terminal 235 and also to a pair of power supply terminals 461 and 462 to which 115 volt, 420 cycle current may be applied. A flyback rectifier 463 is connected between the output terminals 234 and 235.

To synchronize the operation of the pulse position modulator with the operation of the silicon controlled rectifiers 407 and 408 in the power output stage 406, the conductor 448 is connected through a resistor 465 to the cathodes of a pair of rectifiers 466 and 467 having anodes connected to the terminals 461 and 462, and a Zener diode 468 is connected between the conductor 448 and the conductor 428. The rectifiers 466 and 467 cooperate with the rectifiers 459 and 460 of the stage 406 in producing an unfiltered full wave rectified voltage at the conductor 448, relative to the conductor 428, the voltage being limited by the Zener diode 468 to a certain level.

In operation, the unijunction transistor 405 conducts at a certain time after the beginning of each half-cycle of the AC voltage applied to terminals 461 and 462, to apply a pulse to the gates of the silicon controlled rectifiers 407 and 408 through the coupling capacitors 455 and 456. During one half-cycle, the rectifier 407 conducts current from the terminal 461 which flows from the output terminal 235 through the field back to the terminal 235 and thence through rectifier 460 to the terminal 462. During the other half-cycle, the rectifier 408 and the rectifier 459 conduct in a similar fashion. The amount of current so conducted is determined by the timing circuit including resistor 450, transistor 404 and capacitor 449, and is dependent upon the error signal developed by the bridge circuit 401 in the manner as described above.

It will be understood that modifications and variations may be effected without departing from the spirit and scope of the novel concepts of this invention.

We claim as our invention:

1. In an AC supply system including supply line means for connection to a load and a plurality of units, each of said units comprising:
   a prime mover,
   at least one alternator driven by said prime mover,
   control means for controlling said prime mover to control the torque supplied to said alternator and the speed of operation thereof,
   frequency discriminator means for comparing the output frequency of said alternator with a reference to develop a first control signal,
   means for applying said first control signal to said control means to control the speed of said alternator,
   phase discriminator means responsive to the output voltage of said alternator and to the voltage of said supply line means to develop a second control signal varying in amplitude and polarity according to the direction and magnitude of phase difference between said voltages,
   means for applying said second control signal to said control means to synchronize the phases of said voltages,
   and means for thereafter connecting said alternators to said supply line means.

2. In an AC supply system including supply line means for connection to a load and a plurality of units, each of said units comprising:
   a prime mover,
   at least one alternator driven by said prime mover,
   control means for controlling said prime mover to control the torque supplied to said alternator and the speed of operation thereof,
   speed sensing means for developing a first control signal varying with the difference between the speed of said alternator and a reference speed signal,
   means for applying said first control signal to said control means to control acceleration of said alternator to a speed approximately equal to said reference speed,
   phase discriminator means responsive to the output voltage of said alternator and to the voltage of said supply line means to develop a second control signal varying in amplitude and polarity according to the direction and magnitude of phase difference between said voltages,
   means for developing a third control signal when the alternator speed reaches a certain value on the order of 90% of said reference speed value, means responsive to said third control signal and operative after a certain time delay for applying said second control signal to said control means to synchronize the phases of said voltages, and means for thereafter connecting said alternator to said supply line means.

3. In an AC supply system including supply line means for connection to a load and a plurality of units, each of said units comprising:
   a prime mover,
   at least one alternator driven by said prime mover,
   control means for controlling said prime mover to control the torque supplied to said alternator and the speed of operation thereof,
   a combined phase discriminator and load sense circuit operative as a phase discriminator to respond to the output voltage of said alternator and to the voltage of said supply line means to develop a control signal varying in amplitude and polarity according to the direction and magnitude of phase difference between said voltages and operative as a load sensor to develop a load signal proportional to the load supplied by said alternator,
   means for initially operating said circuit as a phase discriminator while applying said control signal to said control means to synchronize the phases of said voltages,
   circuit breaker means for thereafter connecting said alternator to said supply line means, and means for then operating said circuit as a load sensor while applying said load signal to said control means.

4. In a system for supplying power to first and second loads at first and second frequencies, said second frequency being higher than said first frequency,
   a plurality of units each comprising a prime mover and first and second alternators driven by said prime mover and respectively operative at said first and second frequencies,
   first parallelling means for connecting said first alternator to said first load after establishing synchronism between the output voltage thereof and the load voltage,
   a load balancing circuit means operative in response to operation of said first parallelling means for obtaining a balance between the load supplied by said first alternator and the load supplied by the first alternators of other units connected to said first load,
   second parallelling means for connecting said second alternator to said second load after establishing synchronism between the output voltage thereof and the second load voltage,
   and means responsive to operation of said first parallelling means and operative after a certain delay for controlling operating of said second parallelling means.

5. In a system for supplying power to first and second loads at first and second frequencies, said second frequency being higher than said first frequency,
   a plurality of units each comprising a prime mover and first and second alternators driven by said prime mover and respectively operative at said first and second frequencies,
   first parallelling means for connecting said first alternator to said first load after establishing synchronism between the output voltage thereof and the load voltage,
   second parallelling means for connecting said second alternator to said second load after establishing synchronism between the output voltage thereof and the second load voltage,
   means responsive to operation of said first parallelling means and operative after a certain delay for controlling operation of said second parallelling means,
   and a load balancing circuit means operative in response to operation of said second parallelling means for obtaining a balance between the load supplied by said second alternator and the load supplied by the second alternators of other units connected to said second load.

6. In a system for supplying power to first and second loads at first and second frequencies, said second frequency being higher than said first frequency,
   a plurality of units each comprising a prime mover and first and second alternators driven by said prime mover and respectively operative at said first and second frequencies,
   first parallelling means for connecting said first alternator to said first load after establishing synchronism between the output voltage thereof and the load voltage,
   a load balancing circuit operative in response to operation of said first parallelling means for obtaining a balance between the load supplied by said first alternator and the load supplied by the first alternators of other units connected to said first load,
   second parallelling means for connecting said second alternator to said second load after establishing synchronism between the output voltage thereof and the second load voltage,
   means responsive to operation of said first parallelling means and operative after a certain delay for controlling operation of said second parallelling means,
   and a second load balancing circuit means operative in response to operation of said second parallelling means for obtaining a balance between the load supplied by said second alternator and the load supplied by the second alternators of other units connected to said second load.

7. In a system for supplying power to first and second loads at first and second frequencies, said second frequency being higher than said first frequency,
   a plurality of units each comprising a prime mover and first and second alternators driven by said prime mover and respectively operative at said first and second frequencies,
   means for establishing synchronism between the output voltage of said first alternator and the load voltage,
   parallelling means for connecting said first alternator to said first load,
   means for operating said parallelling means after establishing synchronism between the output voltage thereof and the load voltage,
   connection means for coupling said second alternator to said second load, and
   means responsive to a synchronized condition between the output voltage of said first alternator and the first load voltage for operating said connection means.

References Cited
UNITED STATES PATENTS

| | | | |
|---|---|---|---|
| 2,953,691 | 9/1960 | Rapp | 290—4 X |
| 2,872,591 | 6/1956 | Stineman | 290—4 |
| 2,972,058 | 6/1958 | Kahle | 307—57 |
| 3,069,555 | 12/1962 | Kessler | 307—87 |
| 3,210,556 | 10/1965 | Billings | 307—87 |

ORIS L. RADER, *Primary Examiner.*

W. E. DUNCANSON, *Assistant Examiner.*

U.S. Cl. X.R.

307—76